Oct. 29, 1963  W. P. RUGG  3,108,426
RAKE

Filed June 5, 1961

INVENTOR.
WILLIAM P. RUGG
BY
Emery, Booth, Miller + Townsend

ATTORNEYS

United States Patent Office 3,108,426
Patented Oct. 29, 1963

3,108,426
RAKE
William P. Rugg, Greenfield, Mass., assignor to Rugg Manufacturing Company, Greenfield, Mass., a corporation of Massachusetts
Filed June 5, 1961, Ser. No. 114,804
1 Claim. (Cl. 56—400.01)

This invention relates to rakes and more particularly to a rake of the toothed type having improved constructional features affording it superior strength and durability whereby it is adapted for heavy duty use, such as, for example, in landscape grading, sand trap raking, and cold top and asphalt spreading.

The invention will be better understood from a consideration of the following specification taken in conjunction with the accompanying drawings in which FIG. 1 is a perspective view of the assembled rake;

Figure 1:
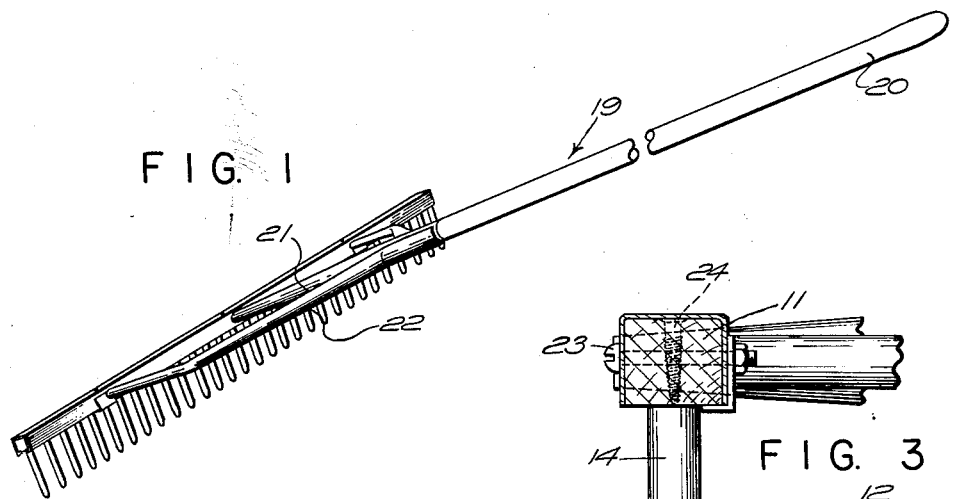

In the preferred embodiment of the drawings the rake hereof comprises a solid wooden head or bar 11 of suitable length and proportion and generally rectangular section. The rake head 11 is bored or drilled at uniformly spaced intervals to present aligned and upright tooth receiving sockets or seats, herein constituted as the through openings or passages 12.

In accordance with the invention, the rake is fitted novelly with teeth 13 of rigid but light weight metal, preferably aluminum, construction, and formed from seamless tubing having straight cylindrical body or back portions 14, which may be proportioned for a press fit in the sockets 12. The hollow metal rake teeth 13 are integrally pointed at their projecting ends by caps or cones 15 which are seen to have straight sides and to be steeply sloping, or converge at an acute angle. Surmounting the cones 15 are tips or noses 16 by which the teeth are closed and blunt ended. The tips 16 are seen more particularly to merge smoothly with the cones 15 and herein to be of domed or spherical configuration, and so defining what might also be called a hollow round or ball point.

A series of retainers or fastenings for the teeth 13, herein shown as the nails 17 but which may also comprise screw or rivet means, are inserted into the rake head to pass transversely through each of the teeth 13 and to anchor in the wooden bar 11 at both sides thereof, thereby firmly to secure the said teeth in operative position in the head.

The invention rake comprises further a sheet metal strip or channel 18 for facing and strengthening the bar 11 and protectively enclosing also the open ends of the teeth 13. The sheath strip or channel 18, preferably aluminum but which may also be galvanized iron, is seen to be fitted closely about the top and sides of the bar and will be understood to stiffen and strengthen the wooden bar 11, and to afford it a skin or facing and also composite structure which is relatively more durable, and in particular more resistant to the damaging incidents of the heavy duty use to which the rake is thereby specially suited.

Figure 3:
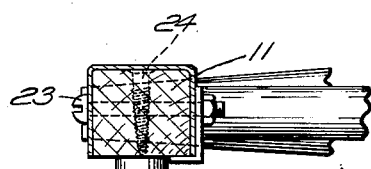
FIG. 3 is a section taken along the lines 3—3 of FIG. 2.
Figure 4:
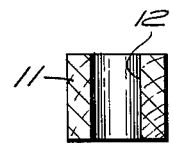
FIGS. 4 and 5 are detail views in vertical section of the improved rake construction.

For manipulating the rake there is provided a handle 19, which may comprise the usual round wooden stock or grip 20 and at the neck a metal ferrule 21 in which the end of the handle may be wholly or partly inserted, and to which are joined as by bolting or riveting a pair of metal bow struts 22. The latter are at their free ends flattened and then bent outwardly parallel to the rake head 11, and there punched for reception of the bolt and nut or similar fastenings 23 which are passed also through suitable openings in the head 11, and by which the struts and also the channel 18 are removably secured to the same. The metal ferrule 21 is inserted in a suitable head opening as may be punched in the sheath 18 and drilled in the bar 11, being secured in the said opening by nail, screw or the like fastening 24, FIG. 3.

The indicated mode of assembling the metal ferrule 21 and bow struts 22 to the sheathed rake head allows the possibility of disassembling and reassembling the rake in order to remove and replace the metal teeth such as may become bent or broken under extreme or damaging use. In this more particularly removal of the two bolt and nut fastenings 23 holding the bow struts 22 and the screw or nail 24 holding the metal ferrule 21 frees the metal sheath 18 for withdrawal similarly from the bar 11. A damaged tooth can then be removed simply by punching or driving it out of its opening 12, whereupon a new tooth may be inserted and pinnned or nailed as before, and the rake then reassembled.

The unique metal rake teeth 13 of the invention are novelly formed by spinning the aluminum tubing with one end held in or against a suitably shaped forming chuck or die, which may be equipped with an automatic feed and cut-off, and be operated in stages.

In accordance with the invention the tubing is spun at a speed to generate a heat, which may be controlled also by a suitable lubricant, to actually flow the metal and more particularly to thicken the wall thereof at the nose or tip 16. Thus it will be seen that the rake tooth of this invention is integrally constructed of a seamless metal tube closed and also thickened at one end, the closed tube end formed more particularly with a blunt or rounded configuration contributing along with the wall thickening to the desired durability and long wearing life of the tooth construction.

It may here be observed that human error in the aligning of the holes, such as may be admissible where are used wooden teeth with adjustable fitting backs, cannot be tolerated with the cylindrical teeth of this invention. But this is of course prevented by the use of an automatic drill, the operation of which it has been found may be made a continuous one in which at a first station the holes are drilled and at a second or subsequent station the teeth are driven into the same. In the driving of the teeth there may be employed a cog and plunger mechanism, which may use an air cylinder timed with microswitches.

Next the head with the teeth inserted is laid on its side and an automatic nailer is employed to drive the nails 17.

Figure 5:
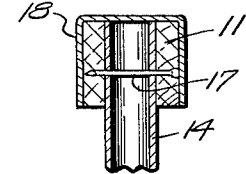
Figure 2:
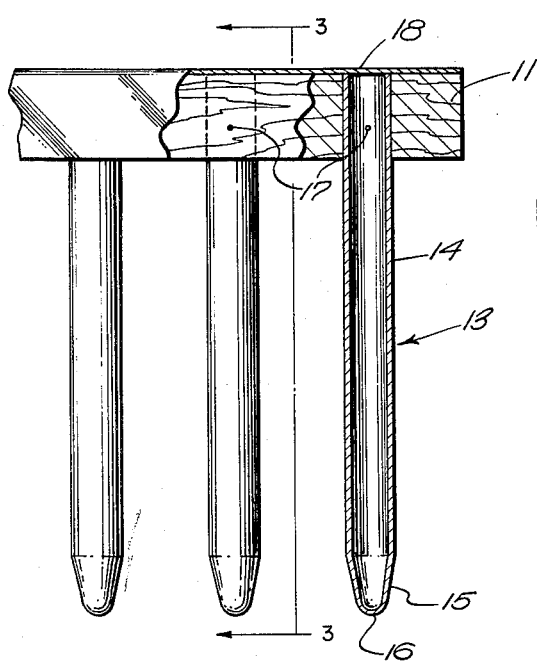
FIG. 2 shows a portion of the head of the rake, partly broken away to illustrate the mounting of the teeth.
Figure 6:
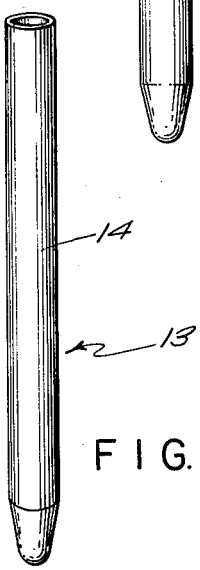
FIG. 6 is a perspective of an exemplary one of the rake teeth.

Considering now the metal sheath 18, that is first pressed from a strip into a U shape. The wooden bar 11 is then dropped into place in the U, forming with that the assembly as shown in FIG. 5. The head 11 is then assembled to the handle, or ferrule 21 and bow struts 22. In this the ferrule 21 and struts 22 may first be assembled and riveted or otherwise fastened together and then fastened to the head, as by the bolt and nut 23 and screw 24 means already described.

My invention is not limited to the particular embodiments thereof illustrated and described herein, and I set forth its scope in my following claim.

I claim:

In a rake, in combination, a head, a handle fastened at one end through said head, bow struts fastened between said handle and head, a series of rigid light weight durable teeth received and fastened in said head, said teeth comprising seamless aluminum tubes integrally die-formed at their projecting ends with conical caps whose sides converge at an acute angle to and merge at a hollow ball point, and a metal sheath around and strengthening said head and also retaining said teeth.

References Cited in the file of this patent

UNITED STATES PATENTS

| | | |
|---|---|---|
| 563,923 | Guernsey | July 14, 1896 |
| 863,915 | Graves | Aug. 20, 1907 |
| 2,478,282 | Kyker | Aug. 9, 1949 |
| 2,570,852 | Pfisterhammer | Oct. 9, 1951 |
| 2,574,932 | Nohl | Nov. 13, 1951 |